Oct. 25, 1932.   C. J. MALM   1,884,035
PHOTOGRAPHIC FILM WITH ANTIHALATION COATING
Filed Feb. 20, 1932
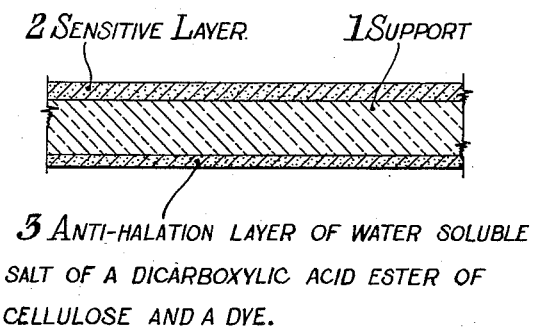
2 SENSITIVE LAYER.   1 SUPPORT
3 ANTI-HALATION LAYER OF WATER SOLUBLE SALT OF A DICARBOXYLIC ACID ESTER OF CELLULOSE AND A DYE.
Inventor:
Carl J. Malm,
By Newton M. Perrins
Attorney.

Patented Oct. 25, 1932

1,884,035

UNITED STATES PATENT OFFICE

CARL J. MALM, OF ROCHESTER, NEW YORK, ASSIGNOR TO EASTMAN KODAK COMPANY, OF ROCHESTER, NEW YORK, A CORPORATION OF NEW YORK

PHOTOGRAPHIC FILM WITH ANTIHALATION COATING

Application filed February 20, 1932. Serial No. 594,261.

This invention relates to a method of coloring sheet material and to the material so colored. It relates more specifically to the application of a color under conditions where it is later desirable that the color be completely removed, and more particularly to a layer that serves as an anti-halation backing for photographic films.

For this purpose it is particularly desirable that the colored layer adhere strongly to the support under ordinary usage, that the color be uniform and that the layer be completely removed, together with all trace of color, from the support in the ordinary photographic baths.

I have discovered that the water-soluble salts of dicarboxylic acid esters of cellulose have the desired qualities and are admirably adapted for such use. These are described in the copending application, Serial No. 380,252, filed July 22, 1929, by Charles E. Waring and myself. The present application is, moreover, a specific improvement and embodiment of the invention generically claimed in the copending application of K. C. D. Hickman, Serial No. 528,266, filed April 7, 1931.

In the single figure of the accompanying drawing is a section on an enlarged scale of a film embodying my invention. As there indicated, it comprises a support 1 of a composition including a cellulose derivative, such as cellulose nitrate or cellulose acetate, a photographically sensitive layer 2 on one surface of the support and, on the other surface, a layer 3 of a water soluble salt of the class mentioned containing a dye or mixture of dyes useful for anti-halation purposes.

The water soluble alkali salts of the class defined are especially useful, among those particularly recommended being sodium cellulose phthalate and the potassium and ammonium salts of cellulose acetate hydrogen phthalate and of cellulose acetate hydrogen succinate.

The number of dyes available for use is practically unlimited. Among these may be mentioned the following: Rhodamine B; Crystal violet 6 B; Nigrosine; Bismarck brown; Tartrazine; Benzopurpurine; Congo red; Metanil yellow; Auramine,—singly or in combination.

The particular dyes chosen would, of course, depend on other factors involved in connection with the film, its sensitivity, use and method of processing.

The water-soluble dye may be added to a water solution of the salt, which is then spread or sprayed over the support. It would also be possible first to coat the carrier layer on the support and then to apply an alcohol soluble dye to the coated layer. Although proportions would depend largely on the desired properties of a particular layer, the following are given merely as examples of formulas which have been found useful:

Formula A:

| | Parts |
|---|---|
| Sodium cellulose phthalate | 5 |
| Crystal violet 6B | 4.5 |
| Tartrazine | 2 |
| Glycerine | .2 |
| Saponin | .1 |
| Water to | 100 |

Formula B:

| | Parts |
|---|---|
| Ammonium cellulose acetate hydrogen phthalate | 5 |
| Nigrosine | 4 |
| Glycerine | .1 |
| Iso-amyl alcohol | .2 |
| Water to | 100 |

A formula may be expressed in general terms as follows:

| | Parts |
|---|---|
| Cellulose derivative | 5 |
| Dye | 4–6 |
| Hygroscopic high boiling solvent | .1–.5 |
| Spreading agent | .1–.5 |
| Water to | 100 |

In the above formulæ, parts are by weight. I consider as included within my invention such modifications and equivalents as are included within the scope of the following claims.

Having thus described my invention, what

I claim as new and desire to be secured by Letters Patent is:

1. A colored sheet comprising a support and a colored layer thereon, the colored layer comprising as a carrier material a water soluble salt of a dicarboxylic acid ester of cellulose.

2. A colored sheet comprising a support and a removable colored layer thereon, the colored layer comprising as a carrier material a water soluble alkali salt of a dicarboxylic acid ester of cellulose and including a dye.

3. An anti-halation photographic film comprising a transparent support having on one surface a sensitive emulsion and upon the other surface a colored anti-halation layer comprising a water soluble salt of a dicarboxylic acid ester of cellulose.

4. An anti-halation photographic film comprising a transparent support of a plastic cellulosic composition having upon one surface a photographically sensitive emulsion and upon the other surface an anti-halation layer comprising a water-soluble alkali salt of a dicarboxylic acid ester of cellulose and containing a dye.

Signed at Rochester, New York, this 12th day of February, 1932.

CARL J. MALM.